United States Patent [19]

Dhooge

[11] Patent Number: 4,925,540

[45] Date of Patent: May 15, 1990

[54] METHOD FOR TREATING ORGANIC WASTE MATERIAL AND AN OXIDATION CATALYST/COCATALYST COMPOSITION USEFUL THEREFOR

[75] Inventor: Patrick M. Dhooge, Corrales, N. Mex.

[73] Assignee: Delphi Research Inc., Albuquerque, N. Mex.

[63] The subject matter of this application is related to that of Applications Nos. 864,410 (now USP 4,752,364 filed May 19, 1986 and 864,411 now USP 4,699,700 filed May 19, 1986.)

[21] Appl. No.: 253,232

[22] Filed: Oct. 4, 1988

[51] Int. Cl.⁵ .......................... B01J 19/10; C01B 31/20
[52] U.S. Cl. .......................... 204/157.42; 204/157.47; 204/157.62; 423/437
[58] Field of Search .................. 423/437; 204/157.92, 204/157.47, 157.62

[56] References Cited

U.S. PATENT DOCUMENTS

| | | | |
|---|---|---|---|
| 1,995,274 | 3/1935 | Eversole | 423/437 |
| 2,756,121 | 7/1956 | Grimes | 423/437 X |
| 4,105,755 | 8/1978 | Darnell | 204/128 X |
| 4,699,700 | 10/1987 | Dhooge | 204/105 R |
| 4,752,364 | 6/1988 | Dhooge | 204/102 X |

Primary Examiner—John F. Niebling
Assistant Examiner—Ben C. Hsing
Attorney, Agent, or Firm—Berman, Aisenberg & Platt

[57] ABSTRACT

A catalyst/cocatalyst composition of matter is useful in oxidizing organic waste material to produce hydrogen. Use of the catalyst/cocatalyst composition causes the reaction rate to increase and causes the energy required for the reaction to decrease. A solution, including the catalyst/cocatalyst composition, and a reaction medium composition further including organic waste material are also described.

20 Claims, 1 Drawing Sheet

METHOD FOR TREATING ORGANIC WASTE MATERIAL AND AN OXIDATION CATALYST/COCATALYST COMPOSITION USEFUL THEREFOR

RELATED APPLICATIONS

The subject matter of this application is related to that of applications Nos. 864,410 (now U.S. Pat. 4,752,364), filed May 19, 1986, and 864,411 (now U.S. Pat. 4,699,700), filed May 19, 1986.

FIELD OF THE INVENTION

This invention relates to the use of a catalyst composition, comprising an oxidation catalyst and a homogeneous cocatalyst, for the gasification of organic waste material.

BACKGROUND OF THE INVENTION

Carbonaceous materials are oxidized when suspended in a solution containing iron (III)/iron (II) and a homogeneous cocatalyst. The organic carbon is converted to $CO_2$ by oxidation with molecular oxygen or oxygen-containing gas liquid or solid mixture.

U.S. Pat. No. 4,105,755 concerns reacting an ash-containing carbonaceous material, optionally an organic waste material, with a halogen, to form a halogen acid, and then decomposing the halogen acid to halogen (recycled) and hydrogen. The halogen acid is preferably decomposed electrolytically if this step of the reaction takes place as a separate step from the initial reaction of the ash-containing carbonaceous material and halogen.

SUMMARY OF THE INVENTION

An object of the present invention is to provide an oxidation reactor system in which organic waste material is oxidized by oxygen using an oxidation catalyst/cocatalyst combination. The over-all reaction is:

$$C + O_2 \xrightarrow{\text{CATALYST}}_{\text{COCATALYST}} CO_2 \uparrow$$

The process employs one of several homogeneous cocatalysts to improve the organic oxidation rate and/or to lower the activation energy for the oxidation of the organic waste material.

Another object of the invention is to provide a method of using an oxidation catalyst/cocatalyst composition for the treatment of organic waste material. A further object of the invention is to provide a solution composition comprising organic waste material, a dispersed oxygen or air stream, oxidation catalyst and cocatalyst.

There are several distinct aspects of this invention:
(a) a catalyst/cocatalyst composition,
(b) use of (a) in a method of oxidizing organic waste material,
(c) use of (a) to reduce energy required to gasify organic waste material,
(d) a solution composition comprising (a), and
(e) a reaction medium composition comprising organic waste material in (d).

Component (a) is an indispensable subcombination of each of the other aspects of the invention. The dispersion of (a) throughout the solution composition imparts homogeneity to the distribution of the cocatalyst and of the oxidation catalyst.

The benefits derived from the use of the oxidation catalyst/cocatalyst are many. The process for treating organic waste material significantly reduces the amount of the solids, producing gaseous products and some residue; it minimizes the amount of waste material which must be dumped or otherwise disposed of. Likewise, an increase in reaction rates using the oxidation catalyst/cocatalyst combination (a) provides energy-saving economy.

DETAILED DESCRIPTION OF THE INVENTION

Figures 1, 2:
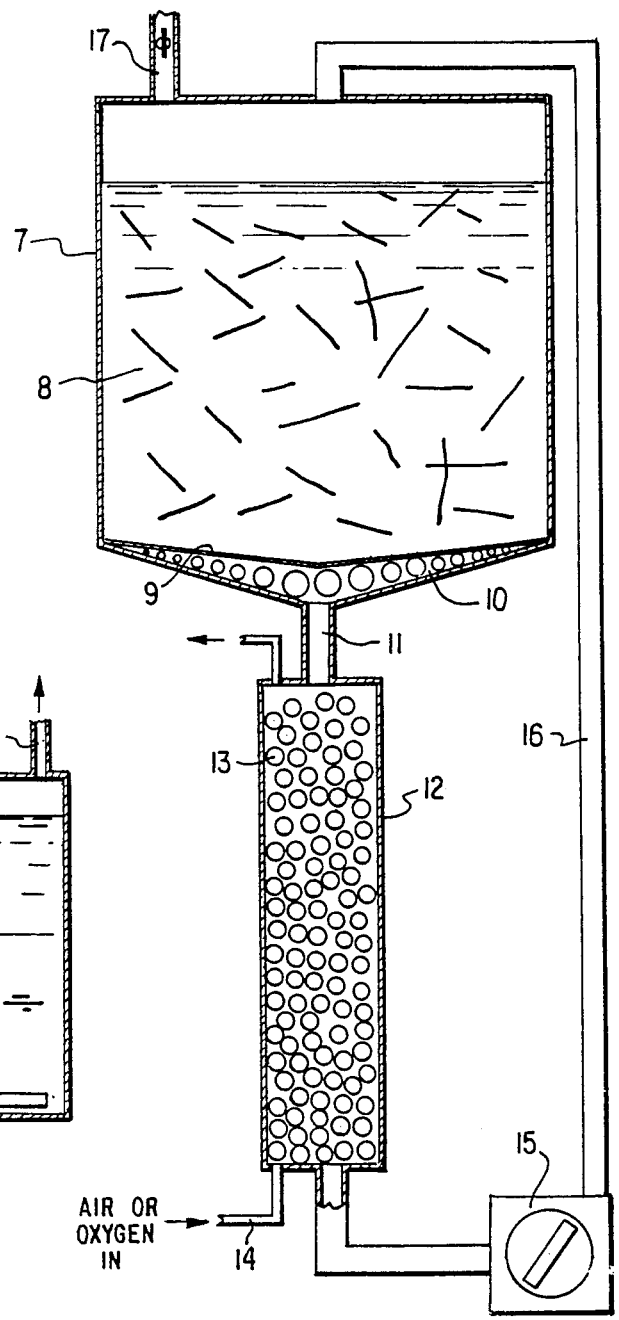
FIG. 1 is a vertical sectional view of an apparatus useful for practicing the invention.
FIG. 2 is a vertical sectional view of apparatus in which the organic reaction area and oxygen dispersion area are separated.

In the process of the invention organic waste material is oxidized by molecular oxygen. The reaction is a catalyzed reaction in which a reversible redox couple acting as a catalytic system oxidizes carbon of the organic waste material. The products of the carbon oxidation are carbon oxides. The process described herein employs iron (III)/iron (II) and one of several homogeneous cocatalysts to improve the organic oxidation rate and/or to lower the activation energy required for the oxidation of the organic material. Obtained data show that the mechanism of the organic oxidation is changed by the homogeneous cocatalyst, which apparently forms an electron transfer complex involving iron (III). This results in improvement in reaction rate and/or lowering of activation energies.

The electron transfer complex must exist at least momentarily to account for increased oxidation rates and lowered activation energies of the reactions taking place. It is postulated that the oxidation mechanism involves a short-lived coordination complex between the organic compound and the homogeneous cocatalyst. An example of such a complex is that of platinum ions or palladium ions with the double bonds of organic compounds, e.g. Ziese's salt anion, the trichloro (ethylene) platinate (II) ion. Complexes, such as Ziese's salt anion, are stable in aqueous solution. Similar platinum-organic double-bond complexes are apparently formed in catalyst mixtures of this invention. The standard potential of the iron (II)/iron (III) redox couple in 1.0M sulfuric acid is +0.69 V. The standard potential of platinum (IV)/platinum (II) redox couple in 1.0M sulfuric acid is also approximately +0.69 V. Thus, the platinum (II) species is in equilibrium with the platinum (IV) species, iron (III) and iron (II), and can be considered to be complexed for at least short periods of time to organic double bonds or other appropriate functionality on the organic compounds. The increase in reaction rate produced by platinum, palladium, rhodium and ruthenium is due to the fact that the homogeneous cocatalyst/organic complexes are more long-lived than the oxidation catalyst/organic complexes and thus are more efficient at transferring electrons. Lowered activation energies are accounted for by the lower activation energy necessary for formulation of the organic compound-homogeneous cocatalyst complex. The required supply of oxidizing electrons can be derived from direct reduction of the cocatalyst, followed by reoxidation by oxygen/oxidation catalyst, or by formation of a short-lived oxidation catalyst/cocatalyst/organic complex in which the cocatalyst compound acts as a bridge to transfer an electron from the organic compound to the oxidation catalyst and from there to the oxygen. Thus, the electron transfer complex (ETC) involved in the oxidation forms spontaneously when the homogeneous cocatalyst is added to a solution containing dissolved or suspended organic compounds which have functional groups or bonds capable of interacting with the cocatalyst. The relative weight ratios vary with the type of organic compound, the type of cocatalyst and the oxidation catalyst. Preferred ranges of proportions for each component are relatively large amounts of organic material (an activity for the organic of 1 or more), a great concentration of the oxidation catalyst (activity of 0.1 to 1.0 or more) and a smaller concentration of the cocatalyst compound (activity of 0.01 to 0.001 or less). The ETC is formed in a solution which solvates the catalysts and at a temperature of 0° C. or higher with an organic material with functionalities which can interact with the cocatalyst, and in the absence of any interfering conditions, such as species which tie up or precipitate the catalysts. The species which precipitate the catalysts are those which form insoluble salts with the catalysts, such as (for the metals) hydroxide, silicate, sulfide, high concentrations of sulfate or high concentrations of phosphate. Species or substances which tie up the catalysts include highly absorptive inert materials, such as clay or activated carbon, or compounds with which the catalysts react irreversibly.

The oxidation catalyst is obtained as pure catalyst, from various salts or compounds of the oxidation catalyst, or from impurities in the organic material.

The solutions usually used in the catalytic system dissolve many metal oxides, sulfides, many metal salts, etc. If any of these compounds exist as impurities in the organic waste used in the reactor, they will be leached out by the solution. Iron is one of the most common metals found in sewage sludge, manure and many other biological wastes, and so can supply part or all of the oxidation catalyst once leached from the organic material. The oxidation catalyst is usually added to the electrolyte, as there is not enough normally found in waste materials to develop the desired reaction rate, but some waste materials will supply their own oxidation catalyst, e.g., when leachable iron is present in sufficient quantity in the waste material. It is doubtful that any waste material will contain sufficient quantities of copper, nickel, platinum, vanadium, etc., to supply their own cocatalyst as well, but such is not precluded. Whether the oxidation catalyst and the cocatalyst are added as metals, metal salts, etc., or leached from the organic waste material does not affect the nature of the process described herein. The catalyst materials are identified by chemical analysis of the waste material to determine catalyst content (if any), and by chemical analysis of the solution (after it has been thoroughly mixed with the waste and allowed to stand for, e.g., from 24 to 72 hours).

The homogeneous cocatalyst is optionally obtained from pure cocatalyst metal, from various salts or compounds of the cocatalyst, or from impurities in the organic material. The homogeneous cocatalyst is dissolved in or homogeneously distributed throughout the catalyst solution. This is advantageous in that it eliminates one heterogeneous step in the process of transfer of electrons from the electrocatalyst and in that the cocatalyst is available to the entire surface of any solid organic particles immersed in the catalyst solution. The cocatalyst is homogeneous with the oxidation catalyst solution, it is a single ion complex (not an admixture), and the homogeneity of the cocatalyst is very critical to the increased reaction reates observed.

The catalyst solution is any solution in which the oxidation catalyst and cocatalyst are soluble, but is typically a solution of a strong mineral acid, such as hydrochloric acid, phosphoric acid or sulfuric acid. The acid solution provides a solubilizing medium for the catalyst composition. The system is satisfactorily operated at various temperatures, depending on the catalyst combination and the organic source; temperatures from 70° C. to 200° C. are typical. However, temperatures from 0° C. to 500° C. or more may be used.

The principle advantage of the process is that it effects the oxidation (without burning or biological digestion) of most organic material directly to simple compounds. Chemical analysis of gaseous products and anolyte solutions after oxidation indicates that the process is clean and efficient, leaving little residue.

Examples of organic waste material or biomass suitable for practicing the invention are woody wastes, cattle manure, sewage sludge, various industrial chemical wastes, food and fiber processing by-products or waste, or any organic material which has a positive cost of disposal.

Examples of oxidation catalyst/cocatalyst compositions useful for practicing the invention are various combinations of metal ion complexes. The complexes vary and depend upon the composition of the solution and the nature of the organic waste material. Iron (III)-/iron (II) ion complexes are the oxidation catalyst. Non-limiting examples of homogeneous cocatalysts are platinum (IV) ion complex, ruthenium (III) ion complex, rhodium (III) ion complex, nickel (II) ion complex, cobalt (II) ion complex, palladium (II) ion complex, copper (II) ion complex and vanadium (V) ion complex. The catalyst solutions are made by dissolving the metal, and/or soluble metal salt in an aqueous solution. Useful combinations of oxidation catalyst and homogeneous cocatalyst include:

| | |
|---|---|
| $iron^{3+}$ with $platinum^{4+}$ | (urea, wood cellulose, manure and/or fat) |
| $iron^{3+}$ with $vanadium^{5+}$ | (sewage sludge) |
| $iron^{3+}$ with $cobalt^{2+}$ | (wood cellulose and/or manure) |
| $iron^{3+}$ with $palladium^{2+}$ | (fat) |
| $iron^{3+}$ with $nickel^{2+}$ | (manure) |
| $iron^{3+}$ with $ruthenium^{3+}$ | (wood cellulose, coal, paunch, blood, protein, others) |

In practicing the invention, an aqueous solvent, an oxidation catalyst and a homogeneous oxidation cocatalyst are combined for oxidizing organic waste material.

The range of oxidation catalyst concentration providing a suitable reaction rate is from 0.01M up to saturation. The preferred range is 0.1M up to 1.0M. The rage of cocatalyst providing an appropriate reaction rate is from 0.0001M to 0.1M. The preferred range is from 0.001M to 0.01M. The preferred ranges provide economy of operation.

The oxidation solution optionally has many different compositions. Various other acids which are suitable are perchloric acid, hydrobromic acid, hydriodic acid, nitric acid, boric acid, hydrofluoric acid, or any other strong acid which is not irreversibly degraded in the system. The important attributes of the solvent are that it is able to solvate the oxidation catalyst and homogeneous cocatalyst, and that it does not degrade in the oxidation system.

Oxygen can be most easily supplied in the form of air. Membrane technology can be used to enrich the oxygen content of the air, and pure oxygen can even be used. Generally, the gas is heated to 200°-300° C. before dispersing into the solution. Heating increases the reaction rate. An alternative to bulk heating is the use of ultrasonic energy to increase the reaction rate.

To aid the reaction, a high surface area material can be added to the catalyst solution. The material will provide more interaction between the catalyst and oxygen. High surface area materials suitable for this use include diatomaceous earth and molecular sieve.

Referring now to the Figures, FIG. 1 shows an apparatus suitable for practicing the invention. Tank 2 contains solution 3 in which disperser 4 is immersed. Solution 3 is a solution containing oxidation catalyst and homogeneous cocatalyst together with the organic waste material. Tube 5 carries oxygen-containing gas (most probably air) to disperser 4. Vent 6 allows release of gases from the reactor. FIG. 2 shows tank 7 which contains a mixture 8 of solvent, oxidation catalyst, homogeneous cocatalyst and organic waste material resting on optional filter screen 9. Organic waste material is reacted with catalyst combination in tank 7, and catalyst solution 10 flows through exit 11 to column 12, which contains support material 13 over which air or oxygen 14 is flowed. Solution from the column is returned via pump 15 and conduit 16 to tank 7 for reuse. Gases generated in tank 7 are withdrawn therefrom through vent 17. Waste material in tank 7 is mixed with catalyst solution by percolation, spraying, stirring, density gradient or other method. Oxidation catalyst which is reduced in tank 7 is reoxidized in column 12 before being returned to tank 7.

Operating limitations are principally imposed by the materials used in construction of the reactor system. The system may be built of very inert, strong, expensive materials, such as a quartz-lined steel, and operated at relatively high temperatures (100° to 500° C. or more) or it may be made from inexpensive materials, such as polypropylene or polyethylene and ordinary glass, and operated at temperatures of 20° C. to 120° C.

Elevated temperatures are used when oxidizing a refractory organic compound, such as lignin, chitin or a saturated aliphatic hydrocarbon; or when excess heat energy is available at low cost. The pressure in the system may vary and is dependent on the nature of the solvent and the organics. A concentrated sulfuric acid solution does not reach one atmosphere (14.7 psia) vapor pressure until 330° C., and concentrated phosphoric acid has a similar low pressure at elevated temperature. The reaction may be run in molten salt solution at elevated temperatures with no significant overpressure in the reactor.

An increase in temperature increases the reaction rate and reduces the necessary size of the reactor for oxidizing a given amount of organic waste material in applications where space is at a premium or rapid oxidation is desired. The acidity of the electrolyte solution affects the reaction rate by aiding in the decomposition of the organic waste compounds due to dehydration and other acid catalyzed reactions.

For oxidative degradation of organic waste material, catalyst and reactor conditions are chosen to insure maximum conversion of the organic waste to an easily disposable form. Strong acid solutions (1M or more) and active catalysts are selected. Useful combinations for oxidative degradation include:

0.5M iron (3+)/0.001M platinum (4+)/fats, wood cellulose or sewage sludge/1M hydrochloric acid;

0.5M iron (3+)/0.01M vanadium (5+)/sewage sludge/1M hydrochloric or sulfuric acid; and 0.05M iron/0.001M ruthenium (III)/cellulose, coal, paunch, blood, protein/1M sulfuric acid.

The temperature of the reactor should preferably be maintained at 95° C. or more for most applications, but for some materials, such as blood, a lower reaction temperature is suitable.

Table I, below, tabulates non-limiting examples of organic material, oxidation catalyst, homogeneous cocatalyst, solvent, reaction rate, and activation energy, particularly pointing out the advantageous effect when a homogeneous cocatalyst is used in combination with an oxidation catalyst contrasted with the use of the oxidation catalyst alone. The reaction rate is significantly increased using the combination of oxidation catalyst and homogeneous cocatalyst of the invention.

In practicing the invention, the mechanism of organic oxidation is changed by addition of the homogeneous cocatalyst to the oxidation catalyst and by formation of an electron transfer complex involving the oxidation catalyst,

TABLE I

| Organic | Oxidation Catalyst | Homogeneous Catalyst | Electrolyte | Reaction Rate (sec$^{-1}$) | $E_A$ (kcal/mole) |
|---------|---------|---------|---------|---------|---------|
| Coal | Iron (III) | Ruthenium (III) | 2M $H_2SO_4$ @ 100° C. | $7.5 \times 10^{-6}$ | 11.1 |
| Coal | Iron (III) | None | 2M $H_2SO_4$ @ 100° C. | $2.1 \times 10^{-6}$ | 11.8 |
| Blood | Iron (III) | Ruthenium (III) | 2M $H_2SO_4$ @ 100° C. | $5.7 \times 10^{-7}$ | 8.3 |
| Paunch | Iron (III) | Ruthenium (III) | 2M $H_2SO_4$ @ 100° C. | $9.7 \times 10^{-6}$ | 16.7 |
| Wood cellulose | Iron (III) | None | 6M $H_2SO_4$ @ 50° C. | $1.4 \times 10^{-6}$ | 12.0 |
| Wood cellulose | Iron (III) | Cobalt (II) | 6M $H_2SO_4$ @ 50° C. | $4.1 \times 10^{-6}$ | 11.3 |
| Wood cellulose | Iron (III) | Platinum (IV) | 6M $H_2SO_4$ @ 50° C. | $3.6 \times 10^{-6}$ | 8.1 |
| Beef fat | Iron (III) | None | 1M $H_2SO_4$ @ 20° C. | $<1 \times 10^{-9}$ | — |
| Beef fat | Iron (III) | Platinum (IV) | 1M $H_2SO_4$ @ 20° C. | $4.7 \times 10^{-7}$ | 4.5 |
| Beef fat | Iron (III) | Palladium (II) | 1M HCl @ 20° C. | $2.2 \times 10^{-6}$ | — |
| Urea | Iron (III) | None | 1M $H_2SO_4$ @ 20° C. | $4 \times 10^{-9}$ | — |
| Urea | Iron (III) | Ruthenium (III) | 1M $H_2SO_4$ @ 20° C. | $2.2 \times 10^{-8}$ | — |
| Urea | Iron (III) | Platinum (IV) | 1M $H_2SO_4$ @ 20° C. | $1.2 \times 10^{-6}$ | 4.8 |
| Cattle manure | Iron (III) | None | 6M $H_2SO_4$ @ 50° C. | $4.0 \times 10^{-7}$ | 12.3 |
| Cattle manure | Iron (III) | Platinum (IV) | 6M $H_2SO_4$ @ 50° C. | $1.1 \times 10^{-6}$ | — |
| Cattle manure | Iron (III) | Cobalt (II) | 6M $H_2SO_4$ @ 50° C. | $1.2 \times 10^{-6}$ | 8.0 |
| Cattle manure | Iron (III) | Nickel (II) | 6M $H_2SO_4$ @ 50° C. | $8.0 \times 10^{-7}$ | — |

TABLE I-continued

| Organic | Oxidation Catalyst | Homogeneous Catalyst | Electrolyte | Reaction Rate (sec$^{-1}$) | $E_A$ (kcal/mole) |
|---|---|---|---|---|---|
| Sewage sludge | Iron (III) | None | 6M $H_2SO_4$ @ 50° C. | $1.2 \times 10^{-6}$ | 18.7 |
| Sewage sludge | Iron (III) | Vanadium (V) | 6M $H_2SO_4$ @ 50° C. | $3.8 \times 10^{-6}$ | 13.3 | homogeneous cocatalyst and the organic waste material. The electron transfer complex has not been characterized but its presence is demonstrated by the reduced activation energies and/or increased reaction rates in the presence of homogeneous cocatalyst as opposed to use of the oxidation catalyst alone, as shown in Table I. The use of the combination of oxidation catalyst and homogeneous cocatalyst of the invention results in the increase in reactio rate and/or a decrease in activation energies.

The invention is further illustrated by the following examples in which all parts and percentages are by weight unless otherwise indicated. These non-limiting examples are illustrative of certain embodiments designed to teach those skilled in the art how to practice the invention and represent the best mode contemplated for carrying out the invention.

EXAMPLES

Example 1

A catalyst solution of 1.0M sulfuric acid containing 0.5M iron (III) and 0.01M cobalt (II) is prepared by diluting 0.055 liter of concentrated sulfuric acid, 100 grams of iron (III) sulfate and 1.55 grams of cobalt sulfate to one liter with water. The resulting solution is stirred thoroughly to dissolve the salts. This solution is then transferred to the tank of FIG. 1. A fritted glass disk is used to disperse heated air in the tank. Approximately 6 grams of sawdust, or other source of cellulose, is added to the tank, following which the tank is heated to 95° C. The reaction has a rate constant of approximately $3.5 \times 10^{-6}$ sec$^{-1}$ (activation energy = 11 kcal/mole). Analysis of the gaseous products of the oxidation shows only carbon dioxide. The reactor tank can be of virtually any size, although up to a point economics of scale favor a large reactor volume.

Example 2

The reactor tank of FIG. 2 is loaded with a supported bed of 500 grams of wood chips over filters of 1.0 mm and 0.25 mm Teflon ® screen. A solution of 1.0M sulfuric acid containing 0.5M iron (III) and 0.01M cobalt (II) is prepared by diluting 0.55 liters of concentrated sulfuric acid, 1000 grams of iron (III) sulfate and 15.5 grams of cobalt (II) sulfate to 10 liters with water. The solution is agitated to dissolve the salts and then transferred into the reactor tank. The reactor tank is sealed, and the catalyst solution is pumped from the tank through a column and back into the tank. The reactor tank is heated to about 95° C. Heated air is counter-flowed through the column. The reaction tank volume is about twice the volume of the solution in liters, and the reaction rate is about $1 \times 10^{-5}$ sec$^{-1}$. Total reaction time is dependent on the flow rate. With a flow rate of 4 liters/sec, a reaction tank volume of 20 liters and a tank loading of 500 grams wood chips, total reaction is achieved in about 46 hours.

Further examples of systems operated at higher temperatures are shown in Table II.

Variations and modifications may be effected within the scope of the invention as described above, and as defined in the appended claims. Throughout the disclosure and claims all references to "homogeneous cocatalyst" mean that the cocatalyst is substantially uniformly dispensed throughout the solution.

TABLE II

| EXAMPLES OF SYSTEMS AT HIGHER TEMPERATURES | | | | |
|---|---|---|---|---|
| Electrocatalyst | Cocatalyst | Electrolyte Medium | Temperature | Pressure |
| 0.2 M Iron (III) | 0.001 M Platinum (IV) | 6 M $H_2SO_4$ | 100° C. | <15 psia |
| 0.2 M Iron (III) | 0.01 M Cobalt (II) | $H_2SO_4$ | 330° C. | ≈15 psia |
| 0.2 M Iron (III) | 0.01 M Vanadium (V) | $H_3PO_4$ | 200° C. | <15 psia |
| 0.2 M Iron (III) | 0.001 M Platinum (IV) | $AlCl_3$ | 200° C. | ≈40 psia |

What is claimed is:

1. A method for gasifying organic waste which comprises:
   combining organic waste with a catalyst composition,
   conducting an oxidation reaction between the organic waste and oxygen in a solution of the catalyst, and
   maintaining an oxygen or air flow through the catalyst solution,
   the catalyst solution containing a combination of (a) an oxidation catalyst and (b) a homogeneous cocatalyst.

2. A method of claim 1 wherein the homogeneous cocatalyst is a member selected from the group consisting of platinum (IV) complex, ruthenium (III) complex, rhodium (III) complex, nickel (II) complex, cobalt (II) complex, palladium (II) complex and vanadium (V) complex.

3. A method of claim 2 wherein the oxidation catalyst is iron (III)/iron (II).

4. A method of claim 1 comprising admixing the organic waste with a solvent and the catalyst composition in a reaction tank.

5. A method of claim 4 comprising dispersing oxygen-containing gas in the reaction tank.

6. A method of claim 4 comprising dispersing oxygen-containing liquid or solid in the reaction tank.

7. A method of claim 1 comprising treating the organic waste in a tank, circulating solution containing the catalyst composition to a column for oxidation by oxygen, and recirculating the solution containing oxidation catalyst and homogeneous cocatalyst to the tank for treating said organic waste.

8. A method of claim 7 comprising flowing oxygen-containing gas through the column.

9. A method of claim 7 comprising flowing oxygen-containing liquid or solid through the column.

10. A method of claim 7 comprising dissolving the catalyst composition in its reduced form in a solvent.

11. A method of claim 1 which is carried out at 0° C. to 500° C.

12. A method of claim 1 wherein the reaction is conducted in a tank to which a high surface area material is added.

13. A method of claim 1 wherein ultrasonic energy is used to increase the reaction rate.

14. A method of claim 1 wherein the catalyst composition increases the reaction rate by an amount greater than that attributable to the additive effect of said oxidation catalyst and said homogeneous cocatalyst, when each is used alone.

15. A method of claim 1 for gasifying organic waste which comprises conducting an oxidation reaction between the organic waste and oxygen in the presence of a catalyst composition which consists essentially of (a) organic waste oxidation catalyst iron (III)/iron (II) and (b) a homogeneous cocatalyst.

16. A method of claim 15 comprising dispersing oxygen-containing gas, oxygen-containing liquid or oxygen-containing solid through the organic waste and catalyst composition.

17. A method of claim 15 which comprises admixing the organic waste with the catalyst composition and dispersing oxygen-containing gas, oxygen-containing liquid or oxygen-containing solid through the resulting admixture, the process being effected over a temperature range and at a reaction rate which is attributable to the catalyst composition and which is greater than the sum of catalytic effects of respective components of said catalyst composition.

18. A process of claim 15 which comprises admixing the organic waste with the catalyst composition and dispersing oxygen-containing gas, oxygen-containing liquid or oxygen-containing solid through the resulting admixture, and wherein, over a temperature range, the steady state reaction activation energy required to oxidize the organic waste is decreased a greater amount by the catalyst composition than by combined catalytic effects of each component of said catalyst composition.

19. A process for gasifying organic waste which comprises combining organic waste material with a solvent containing a catalyst composition comprising (a) an iron (III)/iron (II) oxidation catalyst and (b) a homogeneous cocatalyst, and dispersing oxygen-containing gas, liquid or solid through the resulting mixture, the process being effected at a reaction rate which, at a particular temperature, is attributable to the catalyst composition and which is greater than the sum of catalytic effects of respective components of said catalyst composition.

20. A process for gasifying organic waste which comprises combining organic waste with a solvent containing a catalyst combination comprising (a) an iron (III)-/iron (II) oxidation catalyst, and (b) a homogeneous cocatalyst, and dispersing oxygen-containing gas, liquid or solid through the resulting mixture, wherein, at a temperature, reaction activation energy required to oxidize the organic waste is decreased a greater amount by the catalyst combination than by the combined catalytic effects of each component of said catalyst combination.

* * * * *